United States Patent Office 2,865,824
Patented Dec. 23, 1958

2,865,824
PRODUCTION OF POLYMERS OF ETHYLENICALLY UNSATURATED FLUORINE-CONTAINING COMPOUNDS

Jean W. Borland, Massapequa, and Charles B. Miller, Lynbrook, N. Y., and John H. Pearson, Glen Rock, N. J., assignors to Allied Chemical Corporation, a corporation of New York No Drawing. Application April 2, 1954
Serial No. 420,738
2 Claims. (Cl. 204—163)

This invention relates to the manufacture of polymers of ethylenically unsaturated fluorine-containing compounds, and more particularly to the polymerization of 1,1,2-trifluoro-2-chloroethylene to produce a polymer having excellent physical and chemical characteristics.

Polymers of ethylenically unsaturated fluorine-containing compounds, because of their high degree of inertness, are of great interest for applications in industries in which corrosive substances are needed. Accordingly, production of polymers of such type having exceptional physical stability and resistance to chemicals is of great commercial significance.

In the past, the aforementioned fluorine-containing polymers have been prepared in the presence of various inorganic or organic polymerization catalysts. However, such methods generally possess the disadvantage of requiring substantially long reaction times. Further, the polymer products often fail to meet desired specifications because components of the reaction menstruum and reaction conditions exert conflicting influences upon the length of polymer chain and molecular weight.

An object of the present invention is to provide a simple and efficient method for the polymerization of ethylenically unsaturated fluorine-containing compounds to produce a variety of useful polymers.

More specifically, an object of the present invention is to provide a simple and efficient process for the polymerization of 1,1,2-trifluoro-2-chloroethylene to produce a polymer having excellent physical stability and resistance to chemicals.

Still another object of the present invention is to provide a simple and efficient method for the polymerization of 1,1,2-trifluoro-2-chloroethylene to produce a polymer of relatively high molecular weight which exhibits excellent physical stability and resistance to chemicals.

Various other objects and advantages of the present invention will be apparent to those skilled in the art from the following description and examples.

According to the present invention, polymers of ethylenically unsaturated fluorine-containing compounds are produced by subjecting the monomer to the action of gamma rays for a time sufficient to effect polymerization. The invention not only enables the polymerization reaction to be much accelerated but also has the further advantage of permitting effective control over the molecular weight of polymer product.

The temperature at which the polymerization may be carried out varies from about $-35°$ to about $+50°$ C. We have found that if such temperature is within the range of about $-15°$ to $+15°$ C., polymers of relatively high molecular weight are produced. Inasmuch as determination of molecular weights of the polymers is impractical under normal circumstances, a no-strength-temperature (N. S. T.) test has been used to provide an indication of relative molecular weight in accordance with the procedure outlined on pages 636, 638 and 641 of "Preparation, Properties and Technology of Fluorine and Organic Fluorine Compounds" by Slesser and Schram. Generally speaking, the higher molecular weight polymers have been found to have higher N. S. T. values. Thus, we have found that by use of the aforementioned preferred temperature range of about $-15°$ to $+15°$ C., we have produced polymers having N. S. T. values in excess of $300°$ C. These polymers are particularly suitable for use as electrical components, protective coatings, etc.

When the ethylenically unsaturated fluorine-containing monomer is a gas at normal temperatures and pressures, e. g. 1,1,2-trifluoro-2-chloroethylene, it is advantageous to conduct the polymerization reaction under superatmospheric pressure. Suitable polymerizations have been obtained by carrying out the reaction under the autogenous pressure of the monomer in a closed vessel.

We have found that the degree of polymerization is dependent upon several factors which include temperature, time, and amount of radiation as determined by the strength or position of radiation source. As the temperature or time is increased, the degree of polymerization has also been found to increase. Further, as the strength of the radiation source is increased or the source is moved closer to the vessel containing the monomer, the rate of polymerization has been found to increase.

In connection with the strength of radiation source, we have unexpectedly found that a source of relatively high strength may be employed in order to decrease polymerization time without affecting degradation of the resulting polymers, as would be indicated by low N. S. T. values. Thus, use of a radiation source of at least 48 curies at room temperature has effected at least 50% polymerizations in less than 48 hours to produce polymers having N. S. T. values of at least about $280°$ C.

In accordance with one embodiment of our invention, an ethylenically unsaturated fluorine-containing monomer such as 1,1,2 - trifluoro - 2 - chloroethylene, preferably in purified form, is condensed into a bomb provided with an insert at its bottom within which a source of radiation can be raised. This permits simple and efficient utilization of the radiation source. For polymerizations above a temperature of $-15°$ C. it is preferred to use a stainless steel bomb, while glass bombs as well as the stainless steel bombs are quite suitable for polymerizations at or below $-15°$ C.

The bomb is placed over a source of gamma radiation which suitably is Cobalt-60 (a commercial radio-active form of cobalt which emits gamma rays). The bomb may be provided with any conventional means of agitation, if so desired. Further, if refrigeration is desired, the bomb may be placed within a suitable cooling bath or coil. The source of radiation is raised so that it enters the insert at the bottom of the bomb, and the bomb is then closed. After a predetermined period of time, the radiation source is lowered and the bomb removed. The bomb is opened to release excess monomer which can be recovered and used for subsequent polymerization. The polymer is then taken from the bomb and heated to approximately $150°$ C. to insure the removal of excess monomer.

Purification of the ethylenically unsaturated fluorine-containing monomer is advantageously carried out by washing the monomer with concentrated sulfuric acid to remove inhibitors, then with a dilute caustic soda solution, e. g. about 10%, to remove any residual acid, and finally passing the monomer through a drying agent such as $P_2O_5$.

In addition to 1,1,2-trifluoro-2-chloroethylene polymers, polymers of other ethylenically unsaturated fluorine-containing compounds such as vinylidene fluoride, 1,1,2-trifluoroethylene and 1,1-difluoro - 2 - chloroethylene may be produced by the process of the present invention.

The method of the invention is illustrated by the following examples.

*Example 1.*—300 parts by weight of 1,1,2-trifluoro-2-chloroethylene was charged into a stainless steel bomb providing an interior wall of 2.875 inches internal diameter with wall thickness of 0.187 inch. A 5 curie source of Cobalt-60 was inserted into the bottom of the bomb which was maintained at room temperature for about 24 hours. After removal of unreacted monomer, the polymer was taken from the bomb. Despite the low strength of the radiation source and the relatively short time of exposure, the polymer amounted to about 19% by weight of original monomer and had a no-strength-temperature of about 280° C.

*Example 2.*—In the following tests the same precedure as in Example 1 was used except that the bomb was placed over a 48 curie source of Cobalt-60, and the exposure time was varied. The following results were obtained:

| Exposure, Hours | Polymerization, Percent | No-Strength Temperature, ° C. |
|---|---|---|
| 18.4 | 14.8 | About 280. |
| 40.7 | 50.6 | Do. |
| 67.7 | 87.9 | Do. |

*Example 3.*—The same procedure as in Example 2 was used in the following runs except that the exposure time in every case was 43 hours, and the temperature of the bomb was varied by means of a cooling coil. The following results were obtained:

| Temperature, ° C. | Polymerization, Percent | No-Strength Temperature, ° C. |
|---|---|---|
| −35 | 5.6 | <200 |
| −8 | 14.6 | 305 |
| 0 | 29.8 | 300 |
| +2 | 36.6 | 313 |
| +20 | 50.6 | 278 |
| +43 | 52.6 | 214 |

*Example 4.*—In each of the following runs 250 parts by weight of vinylidene fluoride was charged into the stainless steel bomb used in Example 1. A 48 curie source of Cobalt-60 was inserted into the bottom of the bomb which was maintained at the indicated temperatures by means of a cooling coil for about 12 hours. After removal of unreacted monomer, polymer was taken from the bomb, and the following results were obtained:

Temperature, ° C.: Polymerization, percent
−30 _____ 77.5
−22 _____ 87.7
−12 _____ 89.5

*Example 5.*—The procedure used in Example 4 was employed in the following runs except that room temperature was used, and the time of exposure was varied. The results obtained were as follows:

Exposure, hrs.: Polymerization, percent
4 _____ 17.3
10 _____ 77.7
20 _____ 94.0

*Example 6.*—30 parts by weight of 1,1,2-trifluoro-ethylene was placed in a tank with approximately 100 cm.$^3$ capacity. A 48 curie source of Cobalt-60 was placed beside the tank for 60 hours. At the expiration of this time 20 percent of the material had polymerized.

As variations and modifications may be made in carrying out the processes illustrated, without departing from the scope of the invention, it is to be understood that the invention is not to be limited to the specific embodiments thereof except as defined by the appended claims. Thus, the processes may be employed to prepare copolymers of ethylenically unsaturated fluorine-containing compounds as well as polymers thereof.

We claim:

1. A method of preparing polytrifluorochloro-ethylene having an N. S. T. value in excess of about 300° C. which comprises subjecting 1,1,2-trifluoro - 2 - chloroethylene as sole charge to the action of gamma rays at a temperature of about −15° to +15° C. for a time sufficient to obtain said desired polymerization.

2. A method of preparing polytrifluorochloroethylene having an N. S. T. value in excess of about 300° C. which comprises subjecting 1,1,2-trifluoro - 2 - chloroethylene as sole charge to a source of gamma radiation having a strength of at least 5 curies at a temperature of about −15° to +15° C. for a time sufficient to obtain said desired polymerization.

References Cited in the file of this patent

UNITED STATES PATENTS 2,676,145    Weisz et al. _____ Apr. 20, 1954

FOREIGN PATENTS 570,941    Great Britain _____ July 30, 1945
282,096    Switzerland _____ July 16, 1952
493,531    Canada _____ June 9, 1953

OTHER REFERENCES

Chapiro: Comptes Render, 228, pp. 1490–1492 (1949).
The Science and Energy of Nuclear Power, vol. II, edited by Clark Goodman; Addison-Wesley Press, Cambridge, Mass., 1949, pp. 207–213.